Figure 5:
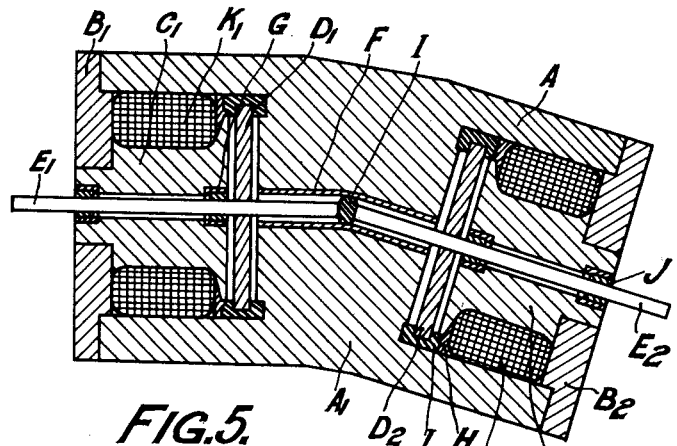

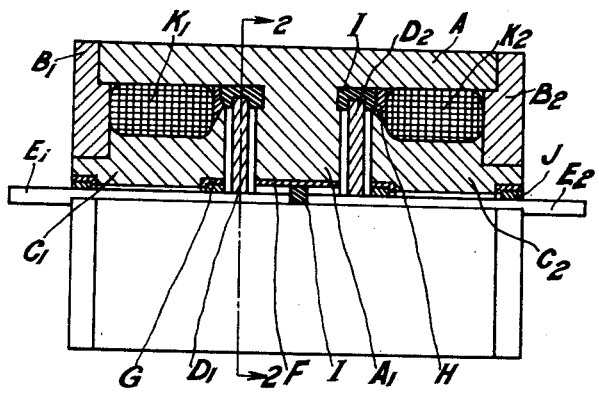
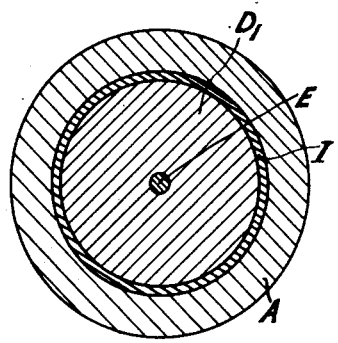
FIG.1.  FIG.2.
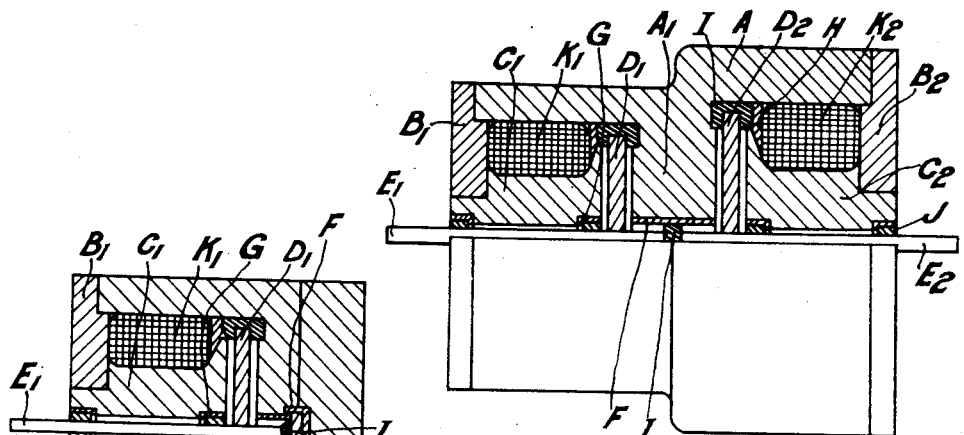
FIG.3.
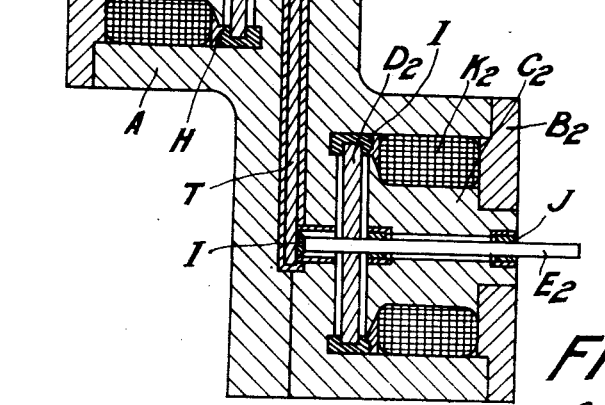
FIG.4.

Jan. 8, 1935.  N. JAPOLSKY  1,987,479
DYNAMO ELECTRIC VARIABLE SPEED POWER TRANSMITTING MECHANISM
Filed Jan. 18, 1934  3 Sheets-Sheet 3
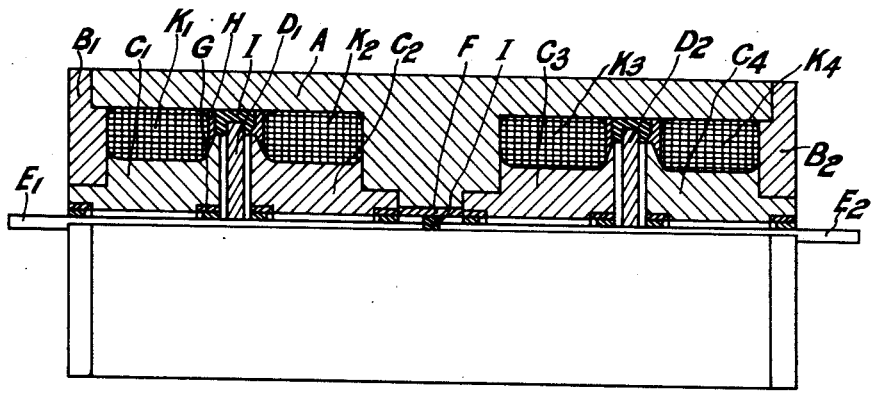
FIG. 9.
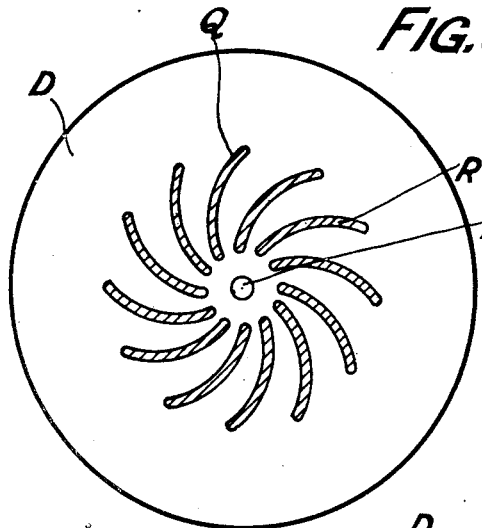
FIG. 10.
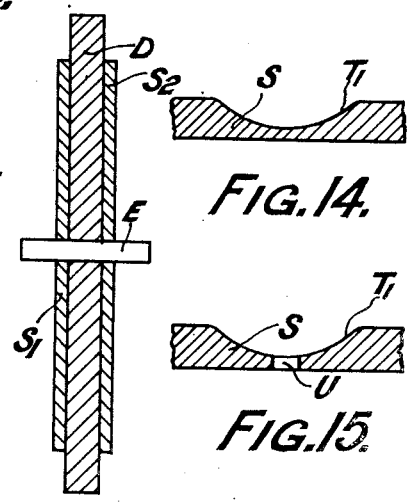
FIG. 11.
FIG. 14.
FIG. 15.
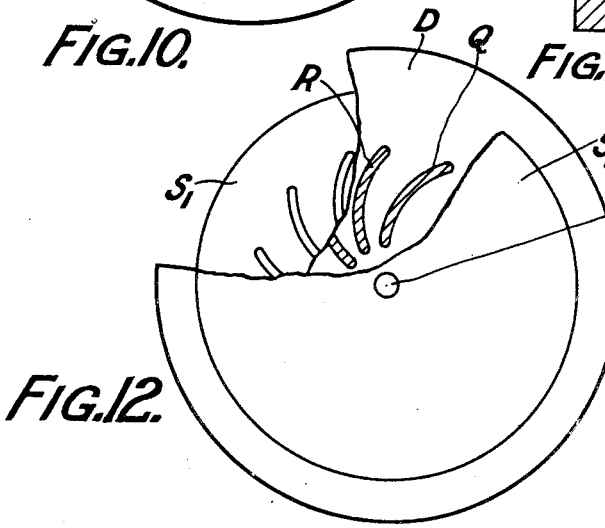
FIG. 12.
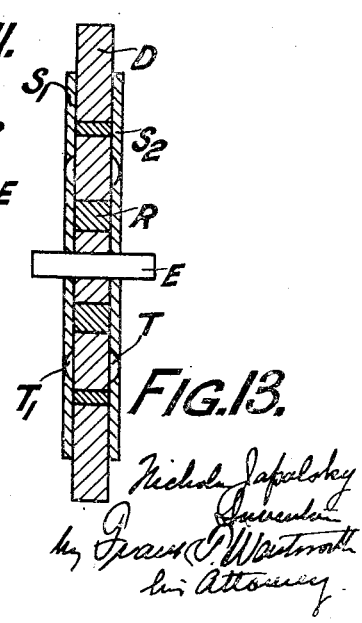
FIG. 13.

Patented Jan. 8, 1935

1,987,479

UNITED STATES PATENT OFFICE 1,987,479

DYNAMO-ELECTRIC VARIABLE SPEED POWER TRANSMITTING MECHANISM

Nicholas Japolsky, London, England

Application January 18, 1934, Serial No. 707,140
In Great Britain January 18, 1933

14 Claims. (Cl. 172—239)

It is required for various purposes, for instance, in the case of ship propulsion, automobile transmission, rolling mill drives, hoisting devices and the like, to obtain a conversion of the speed of the driving motor to the speed of the driven mechanism and, if it is advantageous, that it should be possible to construct or arrange the converting device in such a way as to obtain all the speed ratios within a given range and that, if necessary, these variations of speed could be produced in a continuous manner.

It is the purpose of the present invention to provide an electrical device for obtaining such speed conversion.

In the further description this device will be called, for the sake of brevity, "Electric Speed Converter" or, where convenient, designated by the letters "E. S. C."

The proposed speed converter is of the type consisting essentially of two homopolar machines, one of which is mechanically connected to the driving motor, while the other is mechanically connected to the driven mechanism.

As is known in electric speed converters of this type, the first mentioned homopolar machine acts as a generator of electric energy supplying the current to the latter mentioned homopolar machine which acts as an electric motor, with the obvious exception of the case where re-generative action takes place between the driving and driven members (e. g. re-generative braking) when both machines exchange their relationship to each other in this respect.

The former homopolar machine will, therefore, be called the "generating element", and the latter the "receiving element", of the electric speed converter.

As is well known, the homopolar machine is one of the simplest forms, if not the simplest form of dynamo electric machine. Nevertheless, it has not received any wide practical application, the reason being that the voltage of the homopolar machine in its simplest form is only equal to the voltage obtainable in one conductor of the dynamo electric machine, while increase of this voltage can be achieved at the price of considerable complication, which would negate this simplicity.

This low voltage does not allow of the efficient transmission of the current even over small distances. For this reason, in spite of the simplicity of the homopolar machines, they are not commonly used even for local electric transmission in apparatus for speed conversion and energy re-generation and storing, as. for example, Ward Leonard of Ilgner systems.

Another disadvantage of homopolar machines with ordinary arrangements of the power circuit connections, i. e. when they are connected to each other, in the ordinary manner, through terminals by means of cables or bus bars and collecting brushes, the currents in the armature of the machine are not uniformly distributed around the axis, and, as a result, local magnetic fields are formed, which create eddy currents in the armature, reducing the efficiency of the homopolar machine to a figure far below that obtained by calculations which ignore this phenomenon.

In order to avoid this difficulty, the generating and the receiving elements of the electric speed converters of the type, to which the p1 sent invention relates, can be, as is known, arranged in such a way that their current collecting surfaces should be closely interconnected electrically.

This interconnection can be accomplished by solid and liquid conductors. The former can be formed by the frame of the machine, constituting the magnetic system of its generating and receiving elements.

However, in the systems of the electric speed converters of this type, which were hitherto described or disclosed, the close interconnection between the current collecting surfaces of both elements of the electric speed converter was accomplished in such a way that this resulted in considerable mutual interference between the magnetic circuits of both elements of the E. S. C. In other words, the magnetomotive force of the field winding of the one of the elements not only determined the flux passing through the armature of the same element, but also influenced in a considerable degree the magnetic flux passing through the armature of the other element. It may be, of course, well understood that it is essential for effective control of the electric speed converter to arrange it in such a way that the magnetic circuits of both elements of E. S. C. should be as independent from each other as possible.

The main purpose of the present invention is to attain this mutual independence of the magnetic circuits of both elements of E. S. C. keeping, at the same time, the close connection between the current collection surfaces of both elements.

To achieve this purpose the magnetic system of E. S. C. is arranged in such a way that the armature and the pole pieces with the field winding of each element of the transmission are entirely surrounded by the enclosure of ferromagnetic material (magnetic enclosure) which separates them from the armature, and the pole pieces with field winding, of the other element.

Owing to this arrangement the magnetic flux created by the one element practically does not penetrate through the other element. In other words, the magnetic enclosure acts as a magnetic screen.

The magnetic enclosures of both elements are joined in such a way as to achieve the close electrical connection between the current-collection surfaces of both elements, as is generally appropriate to the electric speed converters of the type to which the present invention relates.

The various forms of execution of the present invention provide means of reducing the influence of the armature reaction in each homopolar machine.

In order that the present invention may be fully understood and readily carried out, several forms of its execution are described below, these descriptions being illustrated by the accompanying drawings, wherein Figure 1 shows, in longitudinal half-section, a form of E. S. C. in accordance with the invention suitable for the case wherein the input and output power shafts are coaxial, Figure 2 is a section on the line 2—2 of Figure 1, Figure 3 is a longitudinal half-section of a modification of E. S. C. suitable for the case wherein the maximum speeds of the input and output shafts are unequal, Figure 4 is a longitudinal section of an E. S. C. wherein the input and output shafts are not coaxial, but parallel with each other, Figure 5 illustrates in longitudinal section an E. S. C. within the input and output shafts are inclined to each other.

Figures 6, 7:
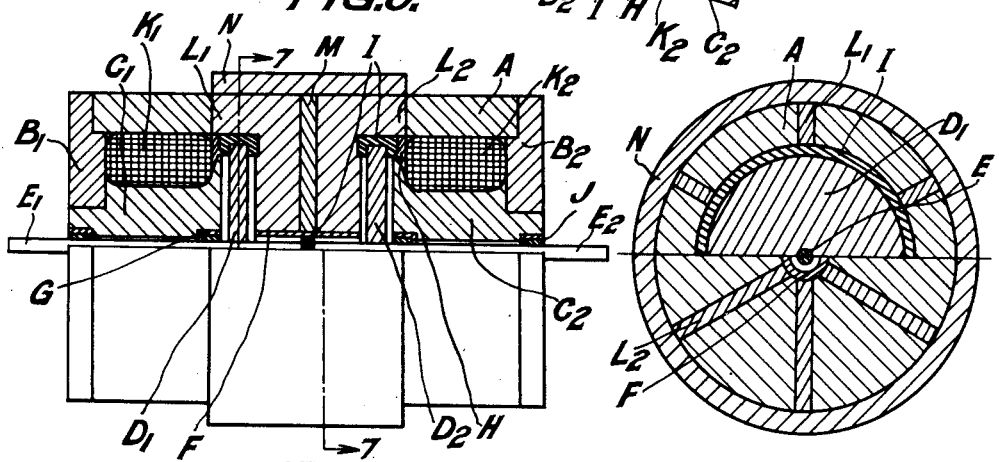
Figure 8:
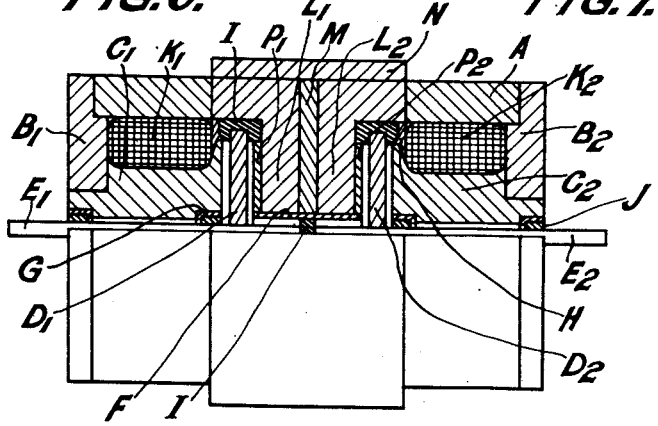

Figure 6 shows a modification of the form of E. S. C. represented in Figures 1 and 2 with a view of mitigating the effect of armature reaction, Figure 7 is a section on the line 7—7 of Figure 6, Figure 8 shows a modification of the arrangement represented in Figures 6 and 7.

Figure 9 shows a modification of the E. S. C. according to the invention with two pole pieces in each element of the converter, Figure 10 shows an armature with non-radial slots arranged for the purpose of compounding the excitation of the machine, and also shows the non-radial slots with iron inserts, Figures 11 and 12 show a modification of the armature with iron insertions having means for preventing the creation of eddy currents, and Figures 13 to 15 show modifications of the construction represented in Figure 11.

Referring to Figures 1 and 2, the magnetic system consists of an outer casing A, with an internal annular extension A1 in the middle, two end covers, B1 and B2, and two pole pieces C1 and C2. Each element of the E. S. C. is excited by a corresponding field winding K1 and K2 respectively. The armature of each element consists of a disc D1, D2 of conducting material (for example copper), fixed on the appropriate shaft E1, E2. The bearings of the shafts are insulated from the body of the machine by insulating sleeves F, G, J. The discs which constitute the armatures of each element of the transmission rotate in mercury, which, owing to centrifugal force, will concentrate, during the movement, around the periphery of the discs. The adjacent ends of two shafts are electrically connected through a mass of mercury. The mercury contacts, both at the periphery of both elements, and at the adjacent shaft faces, are designated by I. In order to prevent loss of mercury from the periphery of the armatures, mercury-retaining rings H, fitted between the magnet casing A and the pole pieces C1, C2 respectively, are provided.

The magnetic flux created by the field winding belonging to each element of the transmission passes through the pole pieces, armature, outer case and respective end covers. It can be easily seen that, owing to the complete separation of the armatures of both elements from each other by the magnetic casing, the M. M. F. produced by the field winding of the one element (say K1) has practically no influence on the flux through the armature of the other element (say D2) of the transmission.

When the fields are excited, and one of the shafts, (say E1) is driven by input power, a current is created which passes through both discs, the sections of the shafts lying between the discs, mercury contacts, I, and part of the magnetic casing between the outer mercury contacts. This current causes the armature of the other element (say D2) to rotate, owing to the interaction between the current flowing in this armature and its magnetic field. By regulating the strength of the magnetic fields, the speed ratio of the input and output shafts can be varied in a continuous manner, according to the well known theory.

When the maximum speed of one of the elements of the transmission is different from the maximum speed of the other, and thus the maximum torque of one element is different from the maximum torque of the other, it is advantageous to make the diameters of the elements unequal, namely, to make the element with the smaller maximum speed (and hence larger maximum torque), of larger diameter. The modification of the E. S. C. in accordance with the present invention, suitable for such a case, is shown in Figure 3. In other respects the arrangement and the action are similar to those of the apparatus represented in Figures 1 and 2. Corresponding parts are designated by similar letters, and, therefore, no specific description of this form of mechanism is necessary.

In some cases a transmission may be required when the input and output shafts are not coaxial. A suitable arrangement for the case of parallel shafts is shown in Figure 4 and, for the case of non-parallel shafts, in Figure 5. In the former case electrical connection between the shafts of the armatures is established by an insulated conducting plate T.

As is well known, the armature current in homopolar machines produces a reaction, which may considerably distort the magnetic field. In order to reduce the effect of this reaction, radial slots L1, L2 can be cut in the parts of the magnetic circuit through which the armature current passes in order to hinder, or at least impede, its flow in a circular direction. Apparatus constructed in this manner is illustrated in Figures 6 and 7, wherein the homopolar machines are respectively provided with radial slots L1, L2, extending throughout the internal extension A1 and along the casing A in an axial direction sufficient to cover the mercury contacts I. The effects of armature reaction may be further counteracted by dividing the casing A at the medial plane at right angles to the axis. Such division may be complete or partial, the latter construction being effected by means of a series of slots M. The slots L1, L2 and M may be left open or may, as indicated, be filled with insulating material. In order to provide the necessary electrical connection for free circulation of current between the two homopolar machines, the portion of the casing wherein the above-mentioned slots are formed is surrounded by a ring N of conducting but non-magnetic material such as copper. Even if the division of the casing be partial, only a very small proportion of the current will flow through the casing between the two elements of the transmission, and, therefore, not only the magnetic flux passing around the axis will be reduced, but distortion which may be due to the creation of local closed fluxes created by current in each radial section of the casing, will be practically absent.

It has been found that there is a tendency for the slots L1, L2 to create inequality in the distribution of the flux density, with the result that eddy currents are generated in the armatures. To overcome this objection, in the construction illustrated in Figures 8 and 9, plates of magnetic material P1, P2 are fitted to the faces of the internal extension A1 facing the armatures, thereby exerting an equalizing action on the distribution of the flux in the intervening air gap.

It will, of course, be understood that the modifications shown in Figures 6 to 9 may be applied in cases wherein the elements are of unequal diameter, or the shafts are not coaxial, whether parallel or inclined.

An E. S. C. in accordance with the present invention may be constructed, having not only one pole piece and field winding in each element of the transmission, but more than one pole piece and field winding. An example of such construction having two pole pieces C1, C2, C3, C4 in each element, is shown in Figure 9. As in other respects this apparatus is similar to that shown in Figures 1 and 2, no specific description seems necessary.

As is known, the armature discs in homopolar machines may be provided with iron sections, in order to reduce the reluctance to the magnetic flux. Such devices also can be, of course, applied to the homopolar machines in E. S. C. in accordance with the present invention.

It is known that for the purpose of obtaining greater efficiency, in a system comprising a special generator and motor, compounding of the excitation by the armature current may be useful. The same applies to the E. S. C. in accordance with the invention. However, the provision of a series excitation winding is inconvenient in homopolar machines, owing to the very large armature currents. In order to avoid this difficulty, spiral slots Q may be cut in the armature, as shown in Figure 10. Accordingly, the current will be forced to follow a spiral path in the armature disc and may therefore be regarded as composed of radial and angular components, the latter of which generates a flux in the axial direction which re-inforces the main field in a manner equivalent to that resulting from the use of a series winding.

The same compounding effect will occur if the iron sections inserted for the purpose of reducing the reluctance of the magnetic flux, are deviated from the radial direction, in other words are of spiral shape, as at R shown in Figure 10.

The drawback of these iron sections may be the possibility of non-uniform angular distribution of the flux passing through the air gap of the homopolar machines, and hence creating eddy currents in the pole pieces. In order to prevent these eddy currents, the discs having iron sections R may be provided with covering sheets S1, S2 made of ferro-magnetic material, as indicated in Figure 11.

The covering iron sheets can, however, create an increase of the reluctance, owing to the influence of the armature reaction. In order to prevent this, and, at the same time, practically eliminate the above-mentioned eddy currents, due to non-uniformity of flux distribution, the covering sheets may be provided with spiral grooves T1 on their inside faces, situated between the spiral iron sections R of the armature: this is illustrated in Figures 13 to 15. The thickness of the covering sheets at the middle of the grooves should be as small as possible, or alternatively, as depicted in Figure 15, a slot U may be cut in the middle.

What I claim and desire to secure by Letters Patent is:—

1. A dynamo-electric power-transmitting mechanism consisting of two homopolar dynamo electric machines having closely interconnected current collecting elements, pole pieces and field windings, comprising a casing of magnetic material common to both machines and entirely surrounding the armatures and pole pieces and field windings and arranged to shield each machine from any magnetic field arising in the other.

2. A dynamo-electric power-transmitting mechanism consisting of two homopolar dynamo electric machines having closely interconnected current collecting elements, pole pieces and field windings, comprising a hollow magnetic cylinder, a central annular extension extending inwardly from the walls of the cylinder between the two machines, and end plates fixed on the ends of the cylinder, and enclosing within the cylinder the field windings and armatures.

3. A dynamo-electric power-transmitting mechanism consisting of two homopolar dynamo electric machines having closely interconnected current collecting elements, pole pieces and field windings, comprising a hollow magnetic cylinder, a central annular extension extending inwardly from the walls of the cylinder between the two machines, and end plates fixed on the ends of the cylinder, and enclosing within the cylinder the field windings and armatures, the pole pieces extending coaxially in the winding and fixed to the end plates.

4. A dynamo-electric power-transmitting mechanism consisting of two homopolar dynamo electric machines having closely interconnected current collecting elements, pole pieces and field windings, comprising a hollow magnetic cylinder, a central annular extension extending from the walls of the cylinder between the two machines, the central annular extension being provided with a transverse division filled with insulating material.

5. A dynamo-electric power transmitting mechanism consisting of two homopolar dynamo electric machines having closely interconnected current collecting elements, pole pieces and field windings, comprising a hollow magnetic cylinder, a central annular extension extending from the walls of the cylinder between the two machines, the central annular extension being divided transversely into two portions separated by insulating material.

6. A dynamo-electric power-transmitting mechanism consisting of two homopolar dynamo electric machines having closely interconnected current collecting elements, pole pieces and field windings, comprising an outer ring of conducting but non-magnetic material a hollow magnetic cylinder, a central annular extension extending from the walls of the cylinder between the two machines, the central annular extension being provided with a transverse division filled with insulating material and bridged by the outer ring of conducting but non-magnetic material.

7. A dynamo-electric power-transmitting mechanism consisting of two homopolar dynamo electric machines having closely interconnected current collecting elements, pole pieces and field windings, comprising a hollow magnetic cylinder, a central annular extension extending from the walls of the cylinder between the two machines, a portion of the cylinder and a corresponding portion of the inward annular extension being provided with radial slots.

8. A dynamo-electric power-transmitting mechanism consisting of two homopolar dynamo electric machines having closely interconnected current collecting elements, pole pieces and field windings, comprising a hollow magnetic cylinder, a central annular extension extending from the walls of the cylinder between the two machines, sheets of magnetic material, a portion of the cylinder and a corresponding portion of the inward annular extension being provided with radial slots: the openings of the slots facing the armature being covered by the sheets of magnetic material.

9. A dynamo-electric power-transmitting machine consisting of two homopolar dynamo electric machines having closely interconnected current collecting elements, pole-pieces and field windings and disc armatures, a casing of magnetic material common to both machines and entirely surrounding the armatures and pole pieces and field windings and shielding each machine from any magnetic field arising in the other, non-radial slots being provided in one of the armatures.

10. A dynamo-electric power-transmitting machine consisting of two homopolar dynamo electric machines having closely interconnected current collecting elements, pole-pieces and field windings and disc armatures, a casing of magnetic material common to both machines and entirely surrounding the armatures and pole pieces and field windings and shielding each machine from any magnetic field arising in the other, non-radial slots being provided in both of the armatures.

11. A dynamo-electric power-transmitting machine consisting of two homopolar dynamo electric machines having closely interconnected current collecting elements, pole pieces and field windings and disc armatures, of highly conductive material, strips of magnetic material, a casing of magnetic material common to both machines and entirely surrounding the armatures and pole pieces and field windings and shielding each machine from any magnetic field arising in the other, non-radial slots being provided in one of the armatures the strips of magnetic material being inserted in the armature slots.

12. A dynamo-electric power-transmitting machine consisting of two homopolar dynamo electric machines having closely interconnected current collecting elements, pole pieces and field windings and disc armatures, a casing of magnetic material common to both machines and entirely surrounding the armatures and pole pieces and field windings and shielding each machine from any magnetic field arising in the other, non-radial slots of spiral form being provided in one of the armatures.

13. A dynamo-electric power-transmitting machine consisting of two homopolar dynamo electric machines having closely interconnected current collecting elements, pole pieces and field windings and disc armatures, sheets of magnetic material a casing of magnetic material common to both machines and entirely surrounding the armatures and pole pieces and field windings and shielding each machine from any magnetic field arising in the other, non-radial slots being provided in one of the armatures, the armature discs being covered by the sheets of magnetic material.

14. A dynamo-electric power-transmitting machine consisting of two homopolar dynamo electric machines having closely interconnected current collecting elements, pole pieces and field windings and discs armatures, strips of magnetic material, and sheets of magnetic material, a casing of magnetic material common to both machines and entirely surrounding the armatures and pole pieces and field windings and shielding each machine from any magnetic field arising in the other, non-radial slots being provided in one of the armatures, the strips of magnetic material being inserted in the armature slots, the armature discs being covered by the sheets of magnetic material, and grooves formed on the inner faces of the sheets of magnetic material such grooves being located between the strips of magnetic material.

NICHOLAS JAPOLSKY.